(12) United States Patent
Yoder et al.

(10) Patent No.: US 7,592,570 B2
(45) Date of Patent: Sep. 22, 2009

(54) OVEN WITH CONVECTION AIR CURRENT AND ENERGY SAVINGS FEATURES

(75) Inventors: Duane Yoder, Fort Wayne, IN (US);
James Blake, Fort Wayne, IN (US);
Roberto Nevarez, New Port Richey, FL (US)

(73) Assignee: Lincoln Foodservice Products LLC, Fort Wayne, IN (US)

( * ) Notice: Subject to any disclaimer, the term of this patent is extended or adjusted under 35 U.S.C. 154(b) by 98 days.

(21) Appl. No.: 11/901,129

(22) Filed: Sep. 14, 2007

(65) Prior Publication Data

US 2008/0067166 A1 Mar. 20, 2008

Related U.S. Application Data

(60) Provisional application No. 60/844,508, filed on Sep. 14, 2006.

(51) Int. Cl.
*A21B 1/14* (2006.01)
*A21B 1/26* (2006.01)
*F27B 9/32* (2006.01)
*F27B 9/36* (2006.01)
*F27D 1/02* (2006.01)
*F27D 7/04* (2006.01)
*F27D 23/00* (2006.01)

(52) U.S. Cl. ........................ 219/388; 219/405; 219/411; 99/443 C; 392/420

(58) Field of Classification Search ........................ None
See application file for complete search history.

(56) References Cited

U.S. PATENT DOCUMENTS

| | | | |
|---|---|---|---|
| 3,239,651 A | | 3/1966 | Silberman .................. 219/388 |
| 4,023,007 A | * | 5/1977 | Brown ........................ 219/388 |
| 4,389,562 A | * | 6/1983 | Chaudoir .................... 219/388 |
| 5,179,265 A | * | 1/1993 | Sheridan et al. ............. 219/497 |
| 5,253,564 A | * | 10/1993 | Rosenbrock et al. .......... 99/328 |
| 5,433,368 A | * | 7/1995 | Spigarelli ...................... 228/8 |
| 5,801,362 A | | 9/1998 | Pearlman et al. ............ 219/400 |
| 6,157,002 A | | 12/2000 | Schjerven, Sr. et al. ..... 219/388 |

(Continued)

OTHER PUBLICATIONS

International Search Report and Written Opinion dated Apr. 29, 2008 based on PCT application No. PCT/US07/20030.

(Continued)

*Primary Examiner*—Joseph M Pelham
(74) *Attorney, Agent, or Firm*—Ohlandt, Greeley, Ruggiero & Perle, L.L.P.

(57) ABSTRACT

An oven for heating, cooking, or toasting a food product. The oven can comprise a conveyor for conveying the food product, and a parabolically shaped top surface with a plurality of reflectors connected thereto, to direct heat back toward the conveyor. The oven can also comprise a fan for circulating air within the oven cavity. The oven can also comprise a controller that can place the oven in an energy savings mode, when it detects that the oven is not in use. The controller can place the oven in energy savings mode by adjusting the speed of, or shutting off the conveyor, or by adjusting the amount of energy supplied to heating elements disposed within the oven.

11 Claims, 9 Drawing Sheets

U.S. PATENT DOCUMENTS

| | | | |
|---|---|---|---|
| 6,242,717 B1 * | 6/2001 | Sanderson | 219/405 |
| 6,369,360 B1 * | 4/2002 | Cook | 219/388 |
| 6,624,396 B2 | 9/2003 | Witt et al. | 219/497 |
| 2003/0213371 A1 * | 11/2003 | Saunders | 99/327 |
| 2004/0022298 A1 | 2/2004 | Gunawardena et al. | 374/141 |
| 2005/0019027 A1 * | 1/2005 | Warren | 392/417 |

OTHER PUBLICATIONS

International Preliminary Report on Patentability dated May 4, 2009, issued in the corresponding International Application No. PCT/US/2007/020030, "New Citations".

* cited by examiner

OVEN WITH CONVECTION AIR CURRENT AND ENERGY SAVINGS FEATURES

CROSS-REFERENCE TO RELATED APPLICATION

The present application claims the priority of U.S. Provisional Application No. 60/844,508, filed on Sep. 14, 2006.

BACKGROUND OF THE DISCLOSURE

1. Field of the Disclosure

The present disclosure relates to an oven or toaster that conveys a food product through the oven or toaster to be heated. More particularly, the present disclosure relates to an oven or toaster with convectional air currents, and a controller for placing the oven in an energy savings mode.

2. Description of the Related Art

Conveyor ovens used to heat food products are well known in the field. Typically, these ovens use a motorized conveyor to move a food product through an oven, where it is heated by heating elements located above and/or below the conveyor. These ovens typically experience problems with heating efficiency due to heat loss through the entrance and exit of the ovens, as well as through the sides and top of the oven itself. In addition, in currently available ovens the food product is heated inefficiently due to an uneven concentration of heat energy throughout the oven cavity. Currently available ovens are also wasteful of energy in that they are operated at full capacity throughout the hours of use, even during long periods of time when food products are not being cooked. The present disclosure overcomes all of these disadvantages of currently available ovens.

SUMMARY OF THE DISCLOSURE

In one embodiment, the present disclosure provides an oven for the heating of a food product. The oven comprising a conveyor, a plurality of heating elements disposed above said conveyor, and a plurality of reflectors connected to a top surface of the oven. The reflectors are disposed on an opposite side of said heating elements from said conveyor.

The top surface, or hood of the oven can be generally parabolic or domed shaped. The reflectors direct the heat coming off the heating elements back to the conveyor belt and food product, thus maximizing the efficiency of the oven. Additionally, the reflectors help to ensure that energy is evenly distributed along the lengths of the heating elements themselves to provide an even concentration of heat energy throughout the oven cavity.

The present disclosure also provides a method of operating an oven. The method comprising the steps of detecting a temperature within the oven, operating in a normal mode when a set change in temperature is detected within a set period of time, and operating in an energy savings mode when said set change in temperature is not detected within said set period of time.

The method prevents unnecessary power consumption by the oven. A controller can be used to detect when there is a long period without a change in temperature inside the oven, which signifies that a food product has not been passed through the oven in that time. The controller then lowers the power to the heating elements and shut off the conveyor, thus preventing the unnecessary use of that power when the oven is not being used. A user can set the oven back into normal mode manually.

The present disclosure can also have a control for displaying the power supplied to the heating elements, which can also be located on the side of an oven face. A voltage identifier feature can detect the voltage being supplied to the unit, and pulse the proper voltage to the heating elements.

DETAILED DESCRIPTION OF THE DISCLOSURE

Figure 1:
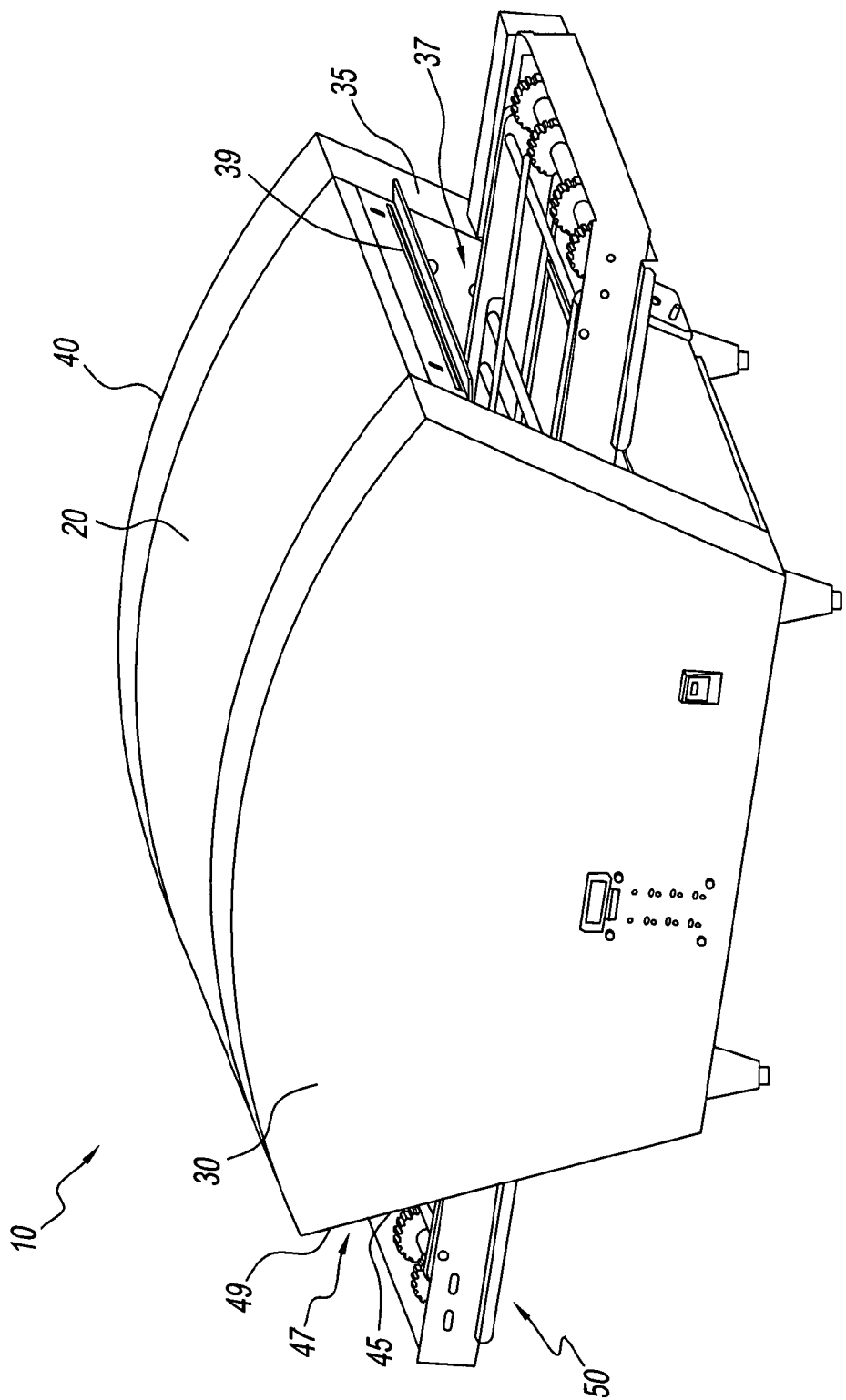
FIG. 1 is a front, right side perspective view of the oven of the present disclosure.

Referring to FIGS. 1-6, and FIG. 1 specifically, oven 10 of the present disclosure comprises top surface 20, front surface 30, right side 35, rear surface 40, left side 45, and conveyor 50. The term "oven" as used in this specification refers to a device that is capable of heating, cooking, toasting, or otherwise treating food products with heat.

Right side 35 further has right side opening 37, and left side 45 has left side opening 47, so that conveyor 50 is situated along the axis of the two openings 37 and 47, and extends past the openings. Thus, the user can place the food product to be heated or toasted onto conveyor 50 near left side opening 47. The food product is heated by a plurality of heating elements located inside oven 10 (discussed below), and can exit at right side opening 37.

Figure 2:
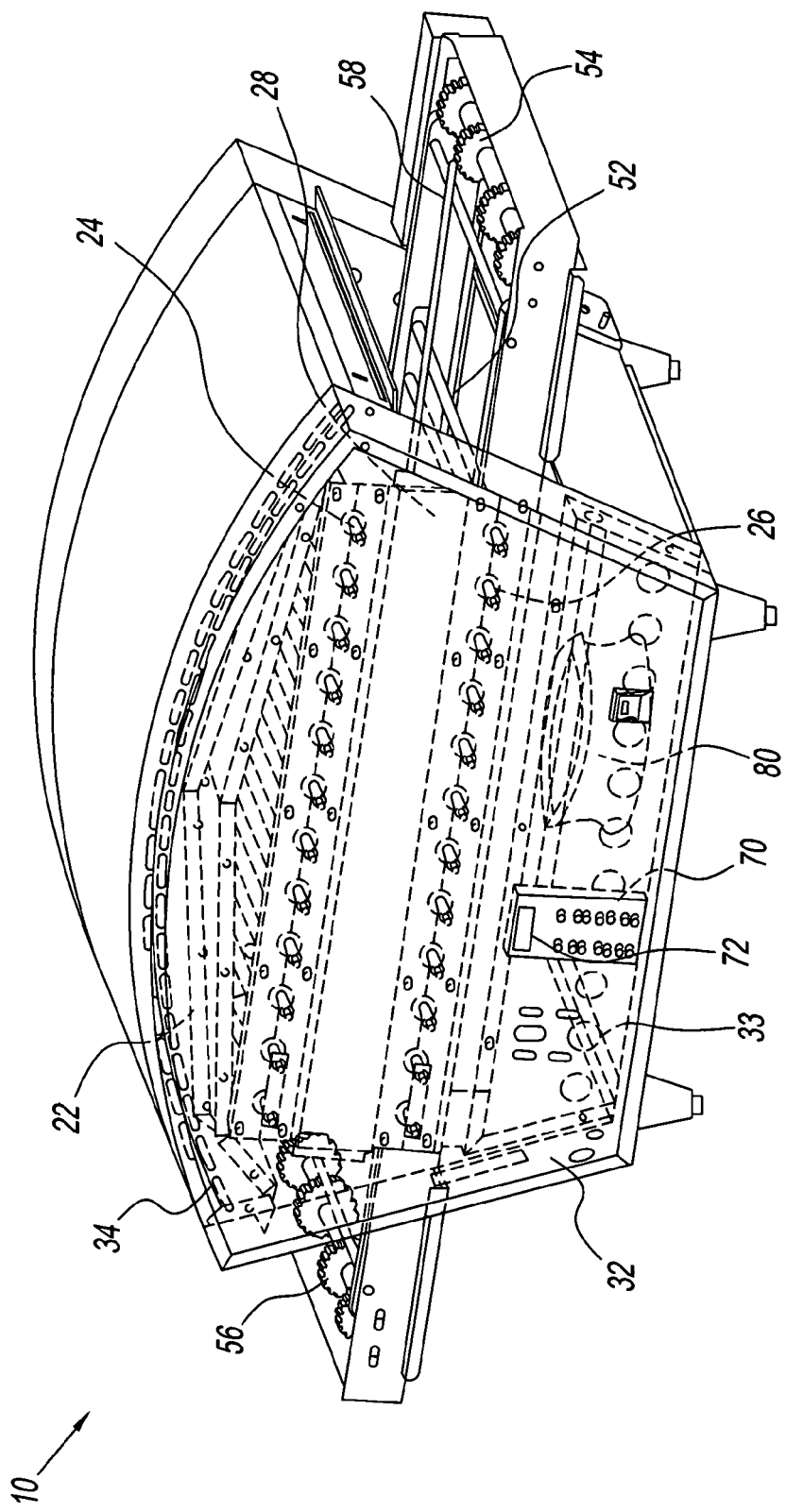
FIG. 2 is a front, right side perspective view of the oven of FIG. 1, with a transparent front panel.
Figure 3:
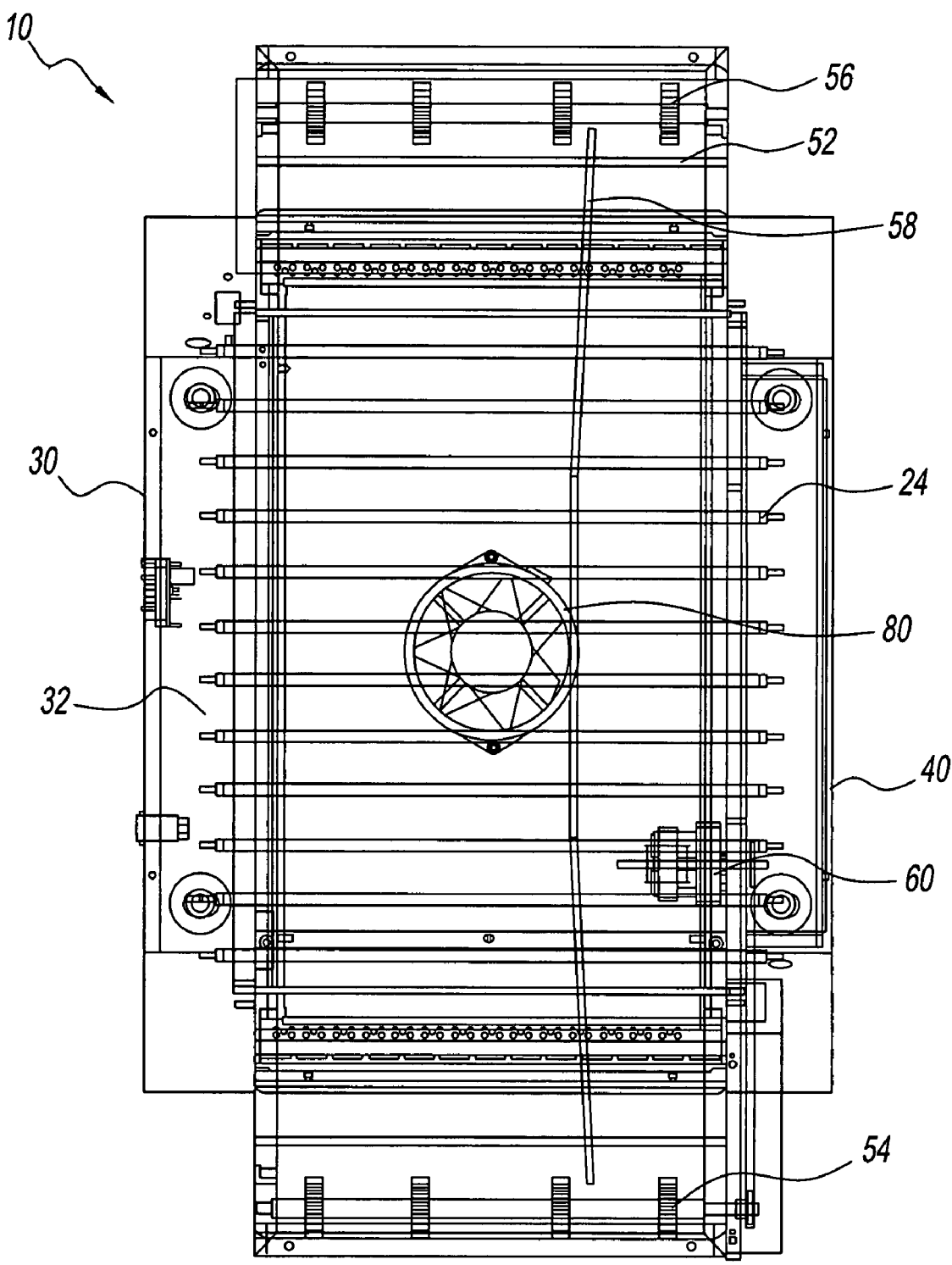
FIG. 3 is a top, transparent view of the oven of FIG. 1.

Top surface 20 of oven 10 can have a substantially parabolic shape and covers conveyor 50. Referring specifically to FIG. 2, top surface 20 has a plurality of reflectors 22 connected to it. Inside oven 10, there can also be a plurality of upper heating elements 24 and lower heating elements 26. Upper and lower heating elements 24 and 26 can be connected to two brackets 28, located on either end of upper and lower heating elements 24 and 26, which secure the heating elements in place. Brackets 28 can be connected to the inside of front and rear surfaces 30 and 40, as in the shown embodiment, or alternatively to top surface 20. In the shown embodiment, upper and lower heating elements 24 and 26 are linear electric heating elements.

Reflectors 22 are arranged in a shape that generally conforms to that of top surface 20. This arrangement of reflectors 22 ensures that heat generated by upper heating elements 24 that travels in a direction away from conveyor 50 and the product to be heated is reflected back in that direction. Additionally, the reflectors 22 help to distribute the heat evenly along the axes of upper and lower heating elements 24 and 26, so that there is a virtually even concentration of heating energy throughout the cavity of oven 10. This improves the overall efficiency of oven 10.

Figure 4:
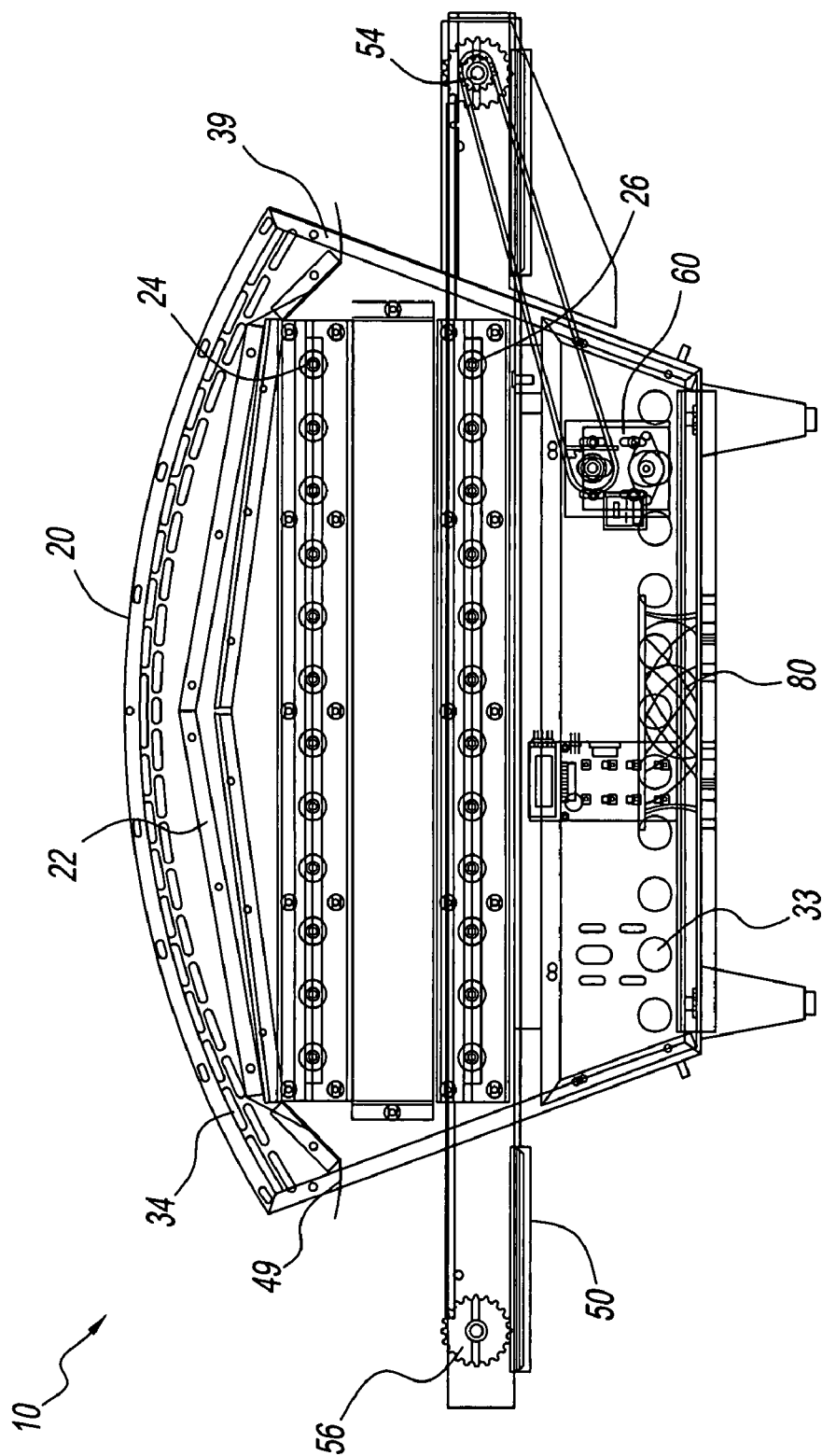
FIG. 4 is a front, transparent view of the oven of FIG. 1.
Figure 5:
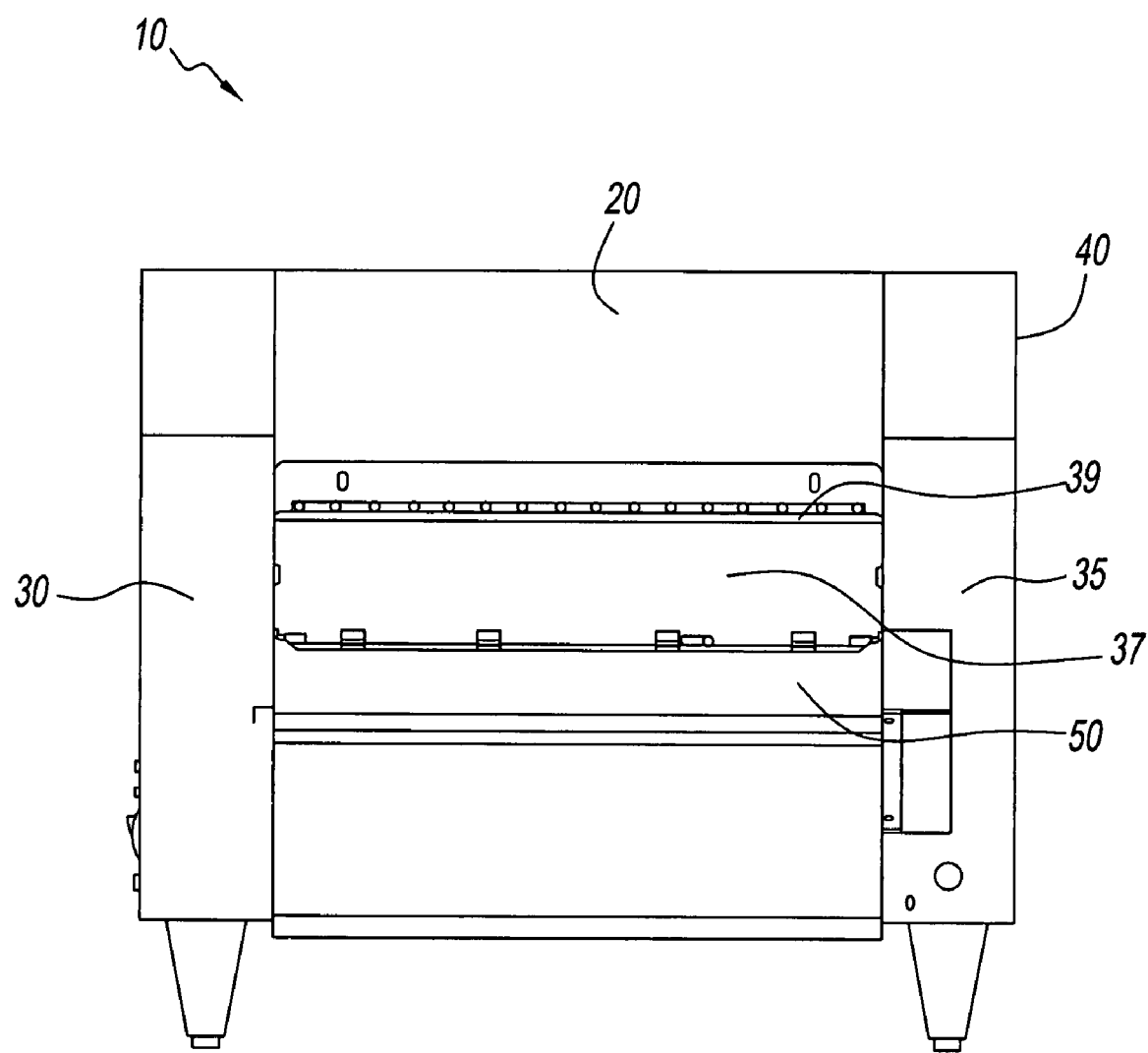
FIG. 5 is a right side view of the oven of FIG. 1.
Figure 6:
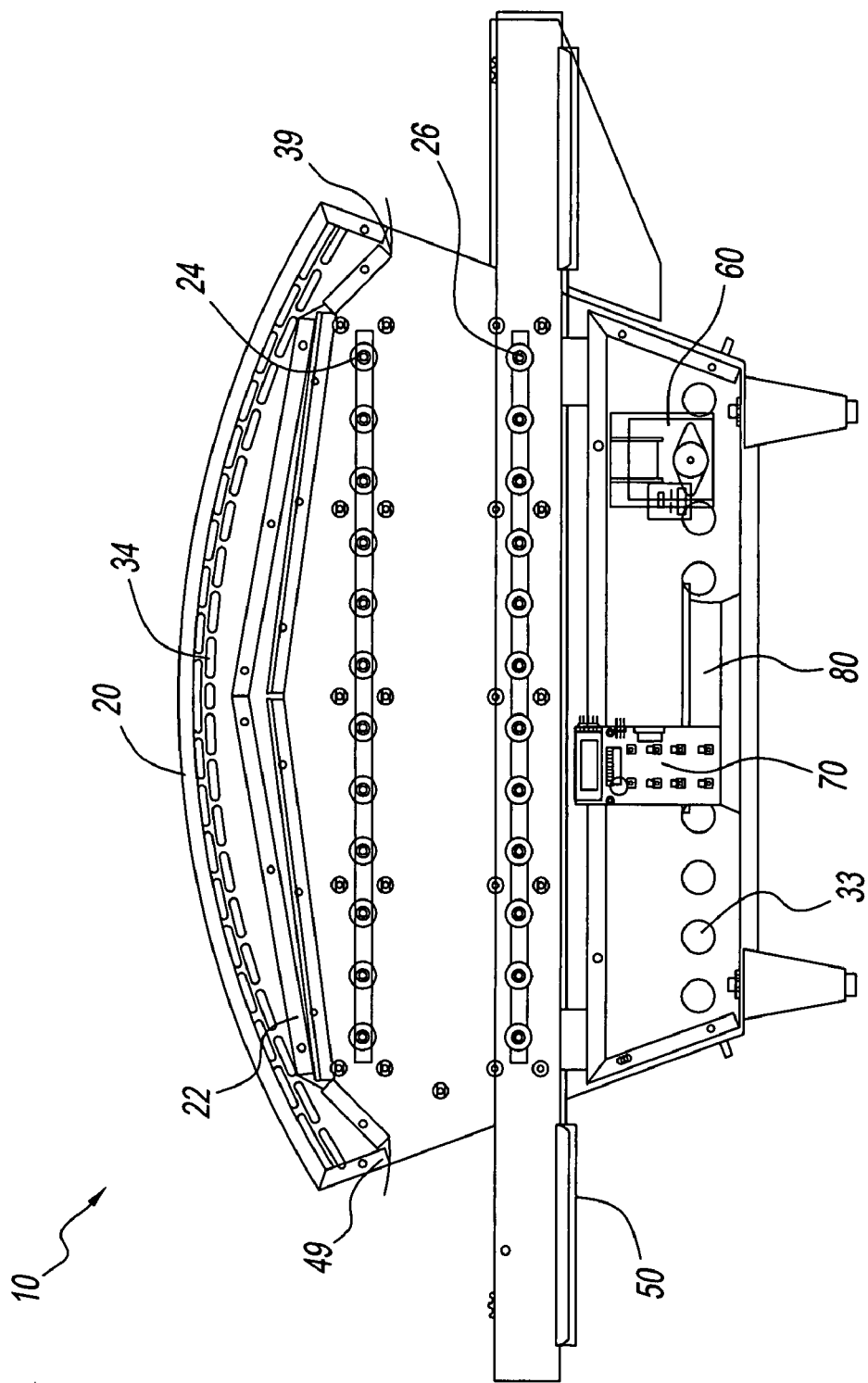
FIG. 6 is a front, transparent view of the oven of FIG. 1.

Conveyor 50 can further have a number of support rollers 52 disposed along its length, which support the food product to be heated and convey it through the oven 10. Conveyor 50 can also have an additional brace 58 to provide additional support. Support rollers 52 are operably connected to right driver 54 and left driver 56, which turn support rollers 52. Referring specifically to FIG. 4, right driver 54 is operably connected to a stepper motor 60. Stepper motor 60 is operably connected to a power source (not shown). In the shown embodiment, right driver 54 is connected to stepper motor 60 with a belt; however, other means of rotating right driver 54 and thus support rollers 52 are contemplated by the present disclosure.

Referring specifically to FIG. 2, oven 10 can also have controller 70. Controller 70 operates a solid state relay that regulates the amount of power being supplied to upper and lower heating elements 24 and 26. Controller 70 can measure the voltage supplied to oven 10, and pulse the correct power to upper and lower heating elements 24 and 26. The present disclosure thus saves considerably on the manufacturing and labor costs which would be associated with manufacturing several different models of units to interface with different voltages at the user's site.

Controller 70 can also be used to regulate the amount of power supplied to upper and lower heating elements 24 and 26 and conveyor 50 when the controller 70 detects that the device is not in use. When a food product is placed in oven 10, the temperature inside the oven cavity drops significantly. Controller 70 can detect when there is no drastic change in the internal temperature of oven 10 during a set period of time, which signifies that there has been no food product placed in oven 10 during that time, and that oven 10 is not in active use. During an energy savings mode, controller 70 can then reduce the amount of power supplied to upper and lower heating elements 24 and 26, and can also stop conveyor 50. This process improves the energy efficiency of oven 10 over those ovens currently available in the field. In addition, the energy savings mode of the present disclosure is executed automatically, unlike power savings features in currently available ovens, which require that a user actively place the oven in a power save mode. An operator can return oven 10 to full operation mode by activating a recovery feature on controller 70, such as a button or power switch. Since it will take some time for the temperature inside oven 10 to recover to full operational level, upon activation of the recovery feature by the user, controller 70 will initially restart conveyor 50 at a slower rate than what is customary for full operational mode. This ensures that the food product will still be cooked or toasted as thoroughly as is desired while oven 10 is in the recovery process, and allows the user to place products inside oven 10 while it is still in that process. This feature thus saves on the costs associated with the time that a user would otherwise have to waste while waiting for the oven to return to full operational mode. Once controller 70 detects that the temperature inside oven 10 is at its full operational level, controller 70 will increase the speed of conveyor 50 to its usual level.

Figure 9:
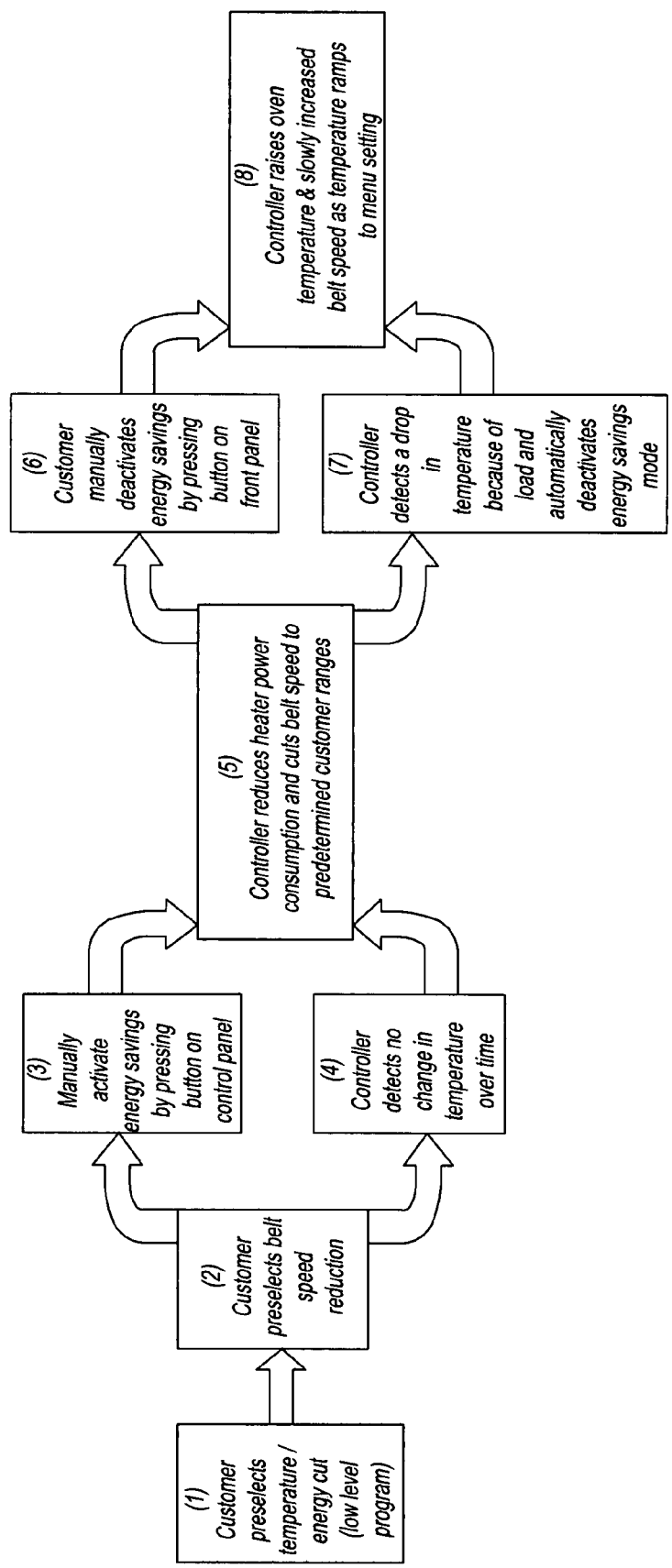
FIG. 9 is a logic and flow diagram of the controller of the present disclosure.

Referring to FIG. 9, a logic and flow diagram of the above described process is shown. In step (1), the user can preset the amount of energy reduction on heating elements 24 and 26 during energy savings mode, by setting the reduction in temperature and/or the duty cycle. The user can also set the desired temperature of oven 10 in normal operating mode. The user can then preset the amount of speed reduction of conveyor 50, as shown in step (2). These parameters can be set with a low-level programming menu. As shown in step (3), the user can manually activate energy savings mode. Once energy savings mode is activated, as shown in step (5), the speed of conveyor 50 is reduced to the value set in step (2), and energy consumption by heating elements 24 and 26 is cut to the level set in step (1). The user can then manually deactivate energy savings mode, as shown in step (6). As shown in step (8), the controller then raises the oven cavity temperature by supplying energy to heating elements 24 and 26, and slowly increases the speed of conveyor 50, while the temperature within the oven returns to the normal operating mode temperature set in step (1). Alternatively, as shown in step (4), controller 70 can automatically enter energy savings mode when no change in temperature is detected over a preset amount of time, indicating that a food load has not been placed into the oven. Controller 70 then reduces the power supplied to heating elements 24 and 26 and slows conveyor 50, as discussed above in step (5). When a food load is placed on the conveyor, thereby dropping the oven cavity temperature, the controller will automatically bring the oven out of energy savings mode, as shown in step (7). The controller then raises the oven cavity temperature and slowly increases the belt speed while the temperature ramps to the normal menu setting, as discussed above with respect to step (8).

Referring again to FIGS. 1-6, oven 10 also has fan 80. Fan 80 can be used to circulate air throughout the cavity of oven 10, which improves the overall heating efficiency of the oven. Referring to FIG. 2, fan 80 can blow air into a front cavity 32, which can be disposed between front surface 30 and the main cavity of oven 10. The air can be circulated by fan 80 through a plurality of lower circulation holes 33, which can be located at the bottom of front cavity 32. The air circulated by fan 80 can travel through front cavity 32 up to the top of the oven, near top surface 20, where there can be a plurality of top circulation holes 34. The air circulated by fan 80 can then enter the main cavity of oven 10 through circulation holes 34. Thus, the air inside the main cavity of oven 10 can constantly be circulated, which assists in the even distribution of heat throughout the main cavity by convection. There can also be a rear cavity, not shown, with a matching set of lower and upper circulation holes, so that the air circulated by fan 80 enters the main cavity of oven 10 from both sides.

In addition, at least a portion of the air circulated by fan 80 exits the right and left sides of oven 10 above right opening 37 and left opening 47, at right vent 39 and left vent 49, respectively. Fan 80 circulates the air with enough force so that an air curtain is formed at vents 39 and 49. The air curtains formed at vents 39 and 49 are aimed back into the cavity of oven 10, so that heated air from inside the cavity is prevented from escaping into the ambient atmosphere. This is an additional feature that improves the overall efficiency of oven 10 by preventing the loss of heated air from the main oven cavity.

Figure 7:
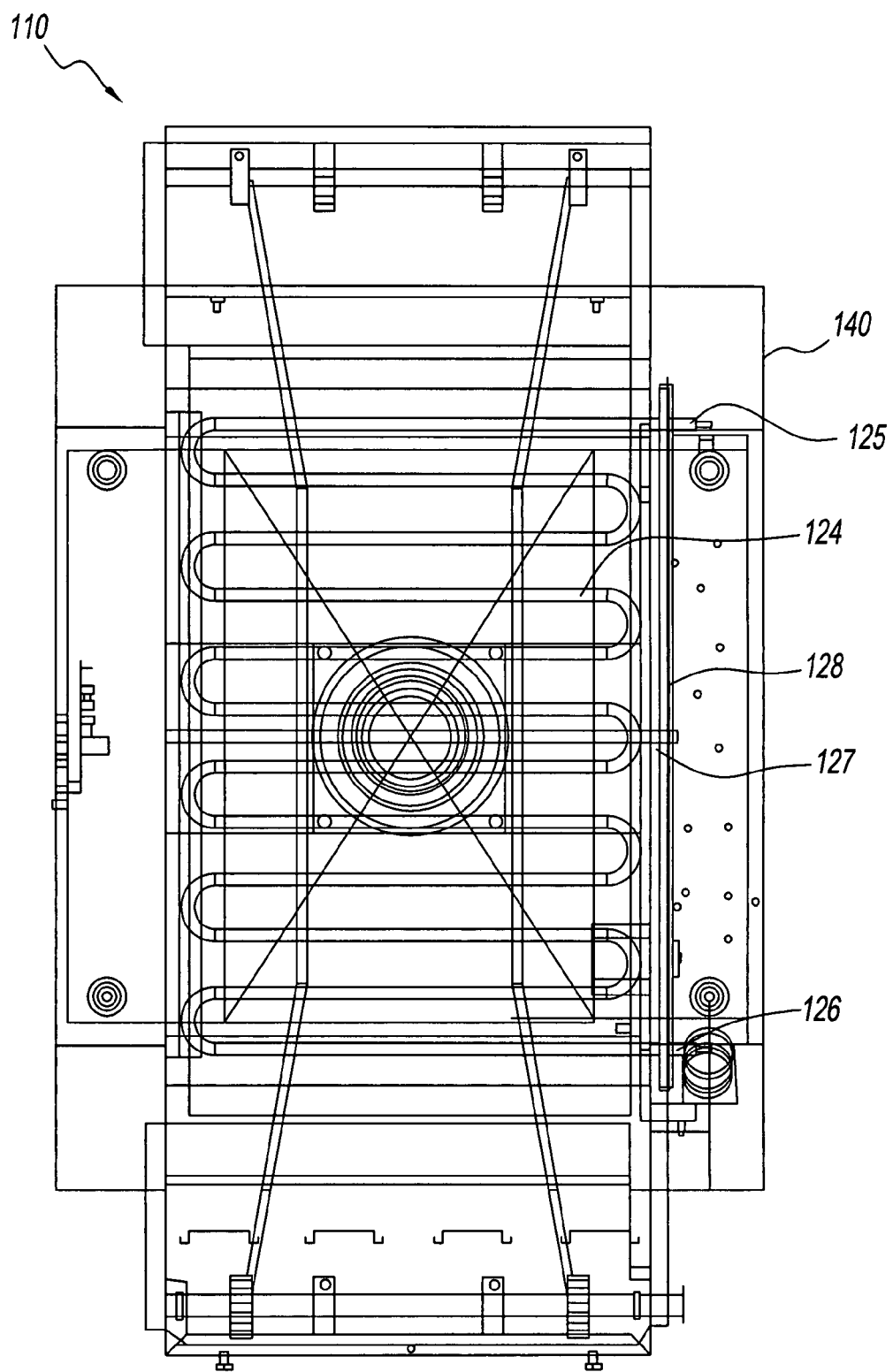
FIG. 7 is a top, transparent view of a second embodiment of the oven of the present disclosure.
Figure 8:
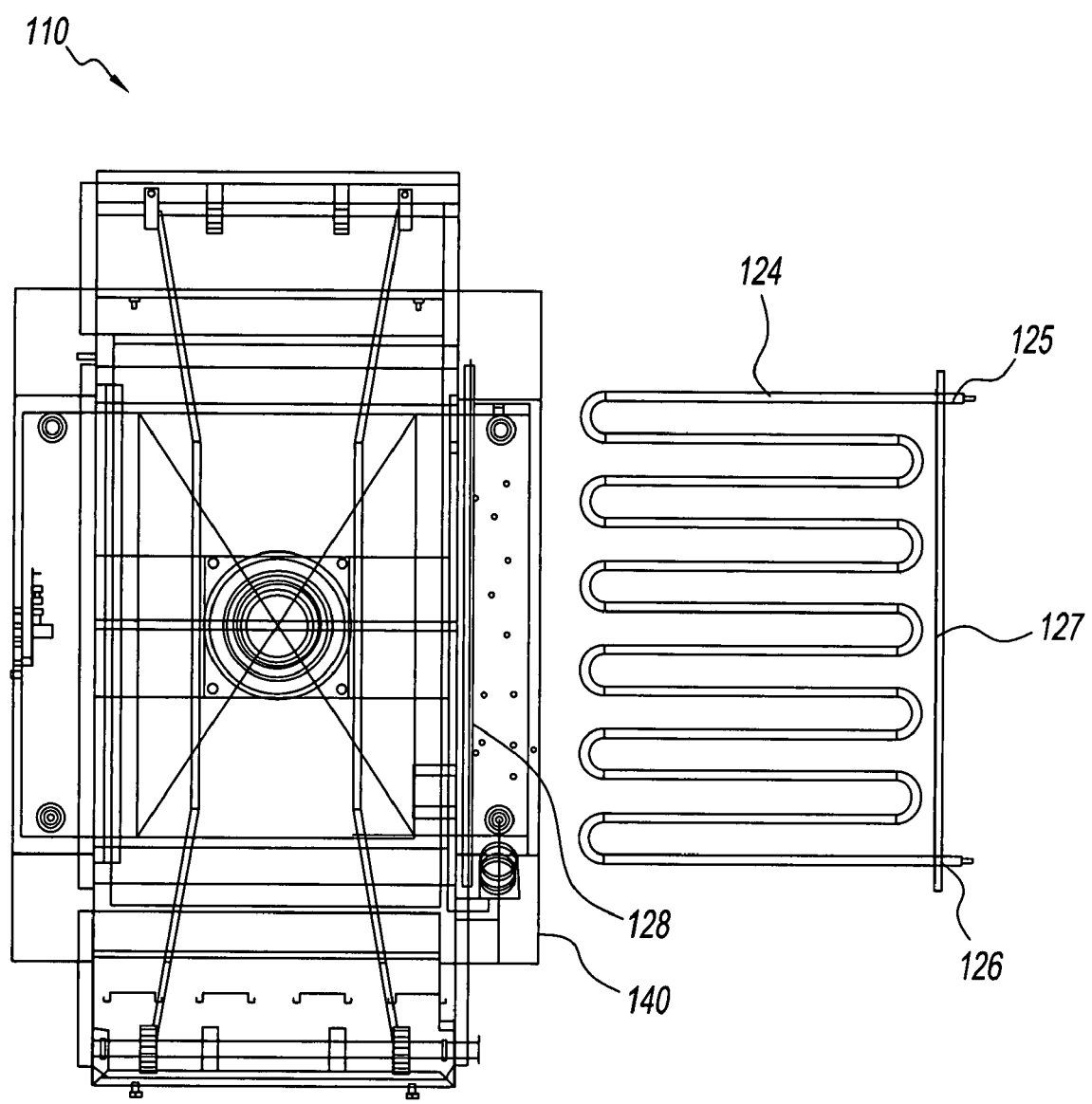
FIG. 8 is an exploded top, transparent view of the oven of FIG. 7.

Referring to FIGS. 7 and 8, a second embodiment of the oven of the present disclosure, oven 110, is shown. With the exception of the features discussed below, oven 110 is identical to oven 10.

Oven 110 has heating element 124. Unlike linear heating elements 24 of oven 10, heating element 124 of oven 110 is a single cartridge-type coiled heating element. Heating element 124 has first end 125 and second end 126, which can be connected to a heating element bracket 127. This assembly can be connected to a mounting bracket 128, which can be connected to the inside of rear surface 140. This feature saves significantly on the assembly and wiring costs that are associated with other kinds of heating elements.

The present disclosure having been thus described with particular reference to the preferred forms thereof, it will be obvious that various changes and modifications may be made therein without departing from the spirit and scope of the present disclosure as defined in the appended claims.

What is claimed is:

1. An oven for the heating of a food product, the oven comprising:
   a conveyor;
   a plurality of heating elements disposed above said conveyor;
   a plurality of reflectors connected to a top surface of the oven, wherein said reflectors are disposed on an opposite side of said heating elements from said conveyor,
   wherein said top surface of the oven is substantially parabolically shaped.

2. The oven of claim 1, wherein said reflectors substantially conform to the shape of said top surface.

3. The oven of claim 1, further comprising a controller, wherein said controller varies a speed of said conveyor.

4. The oven of claim 1, further comprising a controller, wherein said controller varies an amount of energy supplied to said heating elements.

5. The oven of claim 1, further comprising a fan disposed within said oven, wherein said fan circulates air within said oven.

6. The oven of claim 5, further comprising:
   a first opening and a second opening, wherein said conveyor passes through said first opening and said second opening, and
   a first vent and a second vent disposed adjacent to said first opening and said second opening, respectively,
   wherein at least a portion of said circulated air passes through said first vent and said second vent.

7. The oven of claim 3, wherein said controller detects a temperature inside of the oven, and varies said speed of said conveyor when said temperature does not change a set amount within a set period of time.

8. The oven of claim 4, wherein said controller detects a temperature inside of the oven, and varies said amount of energy supplied to said heating elements when said temperature does not change a set amount within a set period of time.

9. The oven of claim 6, wherein said first vent and said second vent are inclined, so that said circulated air passing through said first vent and said second vent is directed back into said first opening and said second opening, respectively.

10. The oven of claim 5, further comprising:
    a main cavity, wherein said conveyor passes through said main cavity,
    a front cavity, and
    a back cavity,
    wherein said front cavity and said back cavity are adjacent to and in communication with said main cavity, and
    wherein said fan circulates air through said main cavity, said front cavity, and said back cavity.

11. The oven of claim 1, further comprising a plurality of heating elements disposed beneath said conveyor.

* * * * *